United States Patent
Keller et al.

(10) Patent No.: US 11,372,810 B2
(45) Date of Patent: *Jun. 28, 2022

(54) STORAGE SYSTEM IMPLEMENTING SNAPSHOT LONGEVITY RANKING FOR EFFICIENT MANAGEMENT OF SNAPSHOTS

(71) Applicant: EMC IP Holding Company LLC, Hopkinton, MA (US)

(72) Inventors: Itay Keller, Tel Aviv (IL); Nir Milstein, Tel Aviv (IL); Yonatan Shtarkman, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/822,818

(22) Filed: Mar. 18, 2020

(65) Prior Publication Data

US 2021/0294774 A1  Sep. 23, 2021

(51) Int. Cl.
  *G06F 16/20* (2019.01)
  *G06F 16/11* (2019.01)
  *G06F 16/901* (2019.01)

(52) U.S. Cl.
  CPC .......... *G06F 16/128* (2019.01); *G06F 16/125* (2019.01); *G06F 16/9027* (2019.01)

(58) Field of Classification Search
  CPC ... G06F 16/125; G06F 16/128; G06F 16/9027
  See application file for complete search history.

(56) References Cited

U.S. PATENT DOCUMENTS

| 5,551,003 A | 8/1996 | Mattson et al. |
| 5,764,880 A | 6/1998 | Gerdt et al. |

(Continued)

FOREIGN PATENT DOCUMENTS

| WO | PCT/US2019/024885 | 1/2020 |
| WO | PCT/US2019/024900 | 1/2020 |

OTHER PUBLICATIONS

Dell EMC, "Dell EMC VxRack FLEX," Dell EMC Product Overview, 2018, 5 pages.

(Continued)

*Primary Examiner* — Tarek Chbouki
(74) *Attorney, Agent, or Firm* — Ryan, Mason & Lewis, LLP

(57) ABSTRACT

Techniques are provided for utilizing snapshot longevity information to manage snapshots of storage volumes in a snapshot-enabled storage system. A snapshot management system maintains a snapshot volume tree which comprises a plurality of snapshots having respective longevity ranking values. The longevity ranking value of a given snapshot represents an expected life span of the given snapshot as compared to expected life spans of other snapshots as indicated by their respective longevity ranking values. When a snapshot is deleted, the snapshot management system determines a set of candidate snapshots which can assume ownership of uniquely-written data of the deleted snapshot, evaluates the longevity ranking values of the candidate snapshots to select a candidate snapshot to assume ownership of the uniquely-written data of the deleted snapshot, and modifies metadata of the selected snapshot to transfer the ownership of the uniquely-written data from the deleted snapshot to the selected snapshot.

18 Claims, 7 Drawing Sheets

(56) References Cited

U.S. PATENT DOCUMENTS

| | | | |
|---|---|---|---|
| 6,052,799 | A | 4/2000 | Li et al. |
| 6,941,420 | B2 | 9/2005 | Butterworth et al. |
| 9,372,751 | B2 | 6/2016 | McNutt |
| 9,514,014 | B2 | 12/2016 | Webman et al. |
| 10,445,180 | B2 | 10/2019 | Butterworth et al. |
| 11,086,545 | B1* | 8/2021 | Dayal ................. G06F 11/1435 |
| 2002/0032835 | A1 | 3/2002 | Li et al. |
| 2005/0066095 | A1* | 3/2005 | Mullick .............. G06F 16/1774 710/200 |
| 2018/0113640 | A1 | 4/2018 | Fernandez et al. |
| 2018/0267893 | A1 | 9/2018 | Barzik et al. |
| 2018/0267985 | A1* | 9/2018 | Badey .................. G06F 16/128 |
| 2018/0300075 | A1 | 10/2018 | Fernandez et al. |
| 2019/0220360 | A1* | 7/2019 | Kashi Visvanathan ...................... G06F 3/0608 |
| 2019/0227845 | A1 | 7/2019 | Sridhar et al. |
| 2020/0363960 | A1* | 11/2020 | Valaguru ................. G06F 3/064 |
| 2021/0157504 | A1* | 5/2021 | Hinman ................ G06F 3/0604 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

* cited by examiner

US 11,372,810 B2

STORAGE SYSTEM IMPLEMENTING SNAPSHOT LONGEVITY RANKING FOR EFFICIENT MANAGEMENT OF SNAPSHOTS

FIELD

This disclosure relates generally to information processing systems, and more particularly to data storage management in information processing systems.

BACKGROUND

Conventional block storage systems are configured to support logical units (LUNs) or other types of storage volumes into which users may write data and from which that data may be read. Users may choose to place data intended for specific uses/applications into separate volumes, so that the data can be easily managed and distinguished. Most storage systems also support functionality for generating volume snapshots. A given such snapshot illustratively comprises a point-in-time copy of the volume. The volume snapshot generation functionality therefore provides the ability to "freeze" the data in a volume at a certain point in time. A given such snapshot can also serve as the source for other snapshots that are spawned from it (e.g., in use cases involving backups). Snapshots can usually be deleted by a user at will, without any type of restrictions.

A simplistic approach for snapshot generation involves duplicating all data of the source volume at the time of snapshot creation. However, this simplistic approach is not only time-consuming, but also highly inefficient in terms of storage space. A better approach is to store just the data unique to that particular snapshot, with any reads to other non-uniquely written regions being redirected to a previous snapshot or the original volume. This approach results in sparsely populated snapshots each of which includes just the uniquely-written data of that particular snapshot. Since the entire data set is not duplicated in this approach, the uniquely-written data is stored in association with additional information, commonly referred to as metadata, which identifies where, in a volume offset domain, the data belongs. This facilitates both access to the unique data itself, and the ability to determine whether redirection to another snapshot or the original volume is required.

Although storing only uniquely-written data within snapshots enables optimal storage space utilization, conventional techniques for reclaiming storage space for overwritten or deleted data items of a volume from the sparsely-populated snapshots tend to be inefficient, and can undermine the overall performance of the storage system.

SUMMARY

Exemplary embodiments of the disclosure include techniques for utilizing snapshot longevity information to manage snapshots of storage volumes in a snapshot-enabled storage system. For example, in one embodiment, a snapshot management system maintains a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective longevity ranking values, wherein the longevity ranking value of a given snapshot volume node comprises a numeric value which represents an expected life span of the given snapshot volume as compared to expected life spans of other snapshot volume nodes indicated by their respective longevity ranking values. The snapshot management system deletes a snapshot volume node from the snapshot volume tree in response to a snapshot delete command and determines a set of candidate snapshot volume nodes within the snapshot volume tree which can assume ownership of uniquely-written data that is owned by the deleted snapshot volume node. The snapshot management system evaluates the longevity ranking values of the candidate snapshot volume nodes, and selects a snapshot volume node from the set of candidate snapshot volume nodes to assume ownership of the uniquely-written data of the deleted snapshot volume node, based on the evaluation of the longevity ranking values. The snapshot management system then modifies metadata of the selected snapshot volume node to transfer the ownership of the uniquely-written data from the deleted snapshot volume node to the selected snapshot volume node.

In another embodiment, the snapshot management system determines the set of candidate snapshot volume nodes within the snapshot volume tree which can assume ownership of the uniquely-written data of the deleted snapshot volume node by identifying each snapshot volume node within the snapshot volume tree which is a reader of the uniquely-written data owned by the deleted snapshot volume node.

In another embodiment, the snapshot management system evaluates the longevity ranking values of the candidate snapshot volumes nodes by determining which of the candidate snapshot volume nodes has a highest longevity ranking value. The candidate snapshot volume determined to have the highest longevity ranking value is selected to assume ownership of the uniquely-written data of the deleted snapshot volume node.

Other embodiments of the disclosure include, without limitation, methods, server nodes, and articles of manufacture comprising processor-readable storage media for utilizing snapshot longevity information to manage snapshots of storage volumes in a snapshot-enabled storage system.

DETAILED DESCRIPTION

Exemplary embodiments will be described herein with reference to exemplary information processing systems that implement snapshot-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
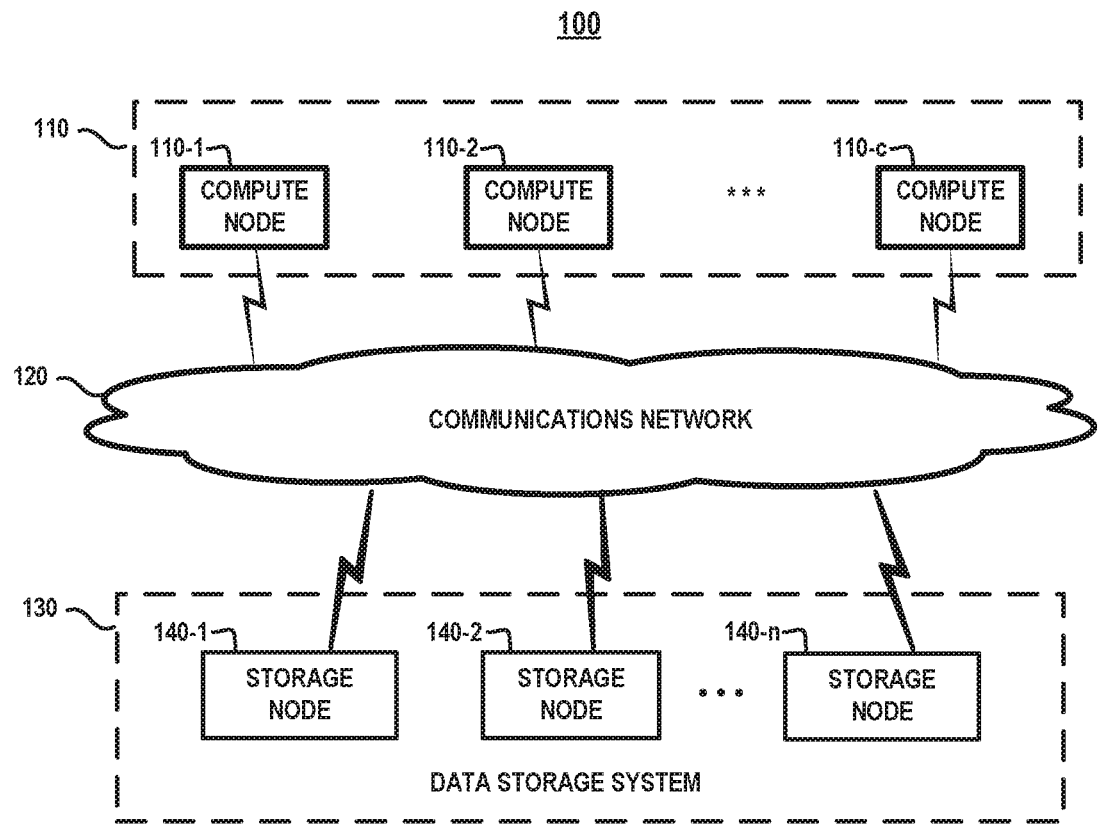
FIGS. 1A and 1B schematically illustrate an information processing system comprising a snapshot-enabled storage system according to an exemplary embodiment of the disclosure.
Figure 1B:
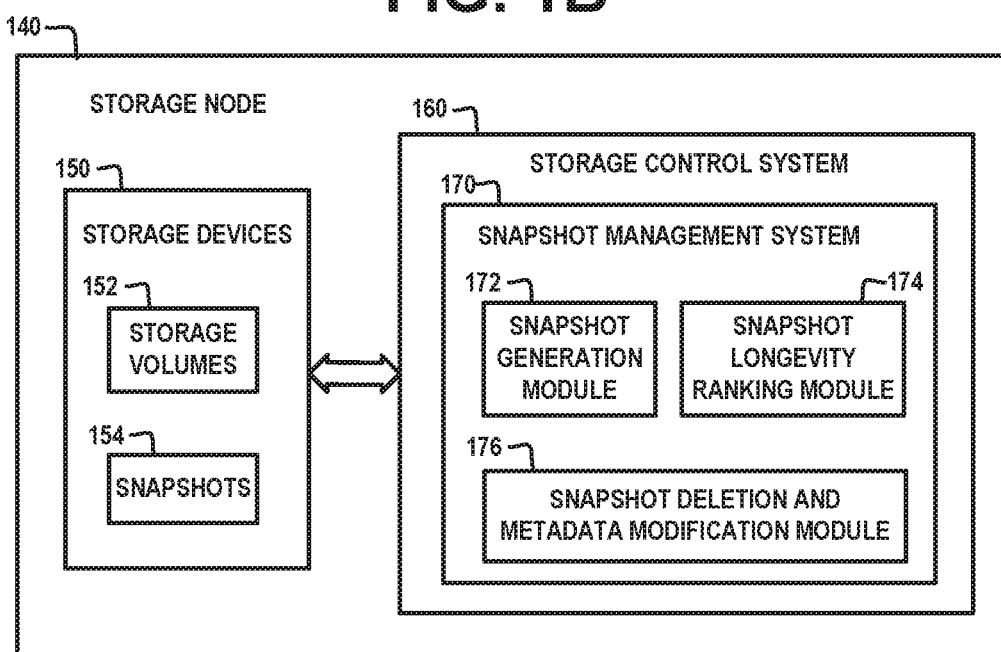

FIGS. 1A and 1B schematically illustrate an information processing system comprising a snapshot-enabled storage system according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), a communications network 120, and a data storage system 130. The data storage system 130 comprises a plurality of storage nodes 140-1, 140-2, . . . , 140-n (collectively referred to as storage nodes 140, or each singularly referred to as storage node 140). FIG. 1B schematically illustrates an exemplary framework of at least one or more of the storage nodes 140. As shown in FIG. 1B, the storage node 140 comprises storage devices 150 and a storage control system 160. The storage control system 160 comprises a snapshot management system 170. The snapshot management system 170 comprises a snapshot generation module 172, a snapshot longevity ranking module 174, and a snapshot deletion and metadata modification module 176, the functions of which will be explained in further detail below.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue input-output (IO) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Internet Protocol (IP) or other communication protocols such as Fibre Channel data transfer protocol, an iSCSI (Internet Small Computer Systems Interface) data transfer protocol, Peripheral Component Interconnect express (PCIe), InfiniBand, Gigabit Ethernet, etc., to support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein is therefore intended to be broadly construed, and should not be viewed as being limited to storage systems of any particular type or types. In some embodiments, the storage nodes 140 comprise storage server nodes (e.g., server node 800, shown in FIG. 8) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 150 comprise DAS resources (internal and/or external storage resources) such as hard-disk drives (HDDs), solid-state drives (SSDs), or other types of non-volatile memory (NVM) devices such as flash memory, non-volatile random access memory (NVRAM), phase-change RAM (PC-RAM) and magnetic RAM (MRAM). These and various combinations of multiple different types of storage devices 150 may be implemented in the storage node 140. In this regard, the term "storage device" as used herein is intended to be broadly construed, so as to encompass, for example, SSDs, HDDs, flash drives, hybrid drives or other types of storage devices. The data storage devices 150 are connected to the storage node 140 through, e.g., a host bus adapter, and using suitable protocols such as ATA, SATA, eSATA, NVMe, SCSI, SAS, etc. In other embodiments, the storage node 140 can be network connected to one or more NAS nodes over a local area network.

The storage control system 160 is configured to manage the storage devices 150 and control I/O access to the storage devices 150 and/or other storage resources (e.g., DAS or NAS resources) which are directly attached or network-connected to the storage node 140. In some embodiments, the storage control system 160 is a component of a software-defined storage (SDS) system which supports the virtualization of the storage devices 150 by separating the control and management software from the hardware architecture. More specifically, in an SDS environment, the storage control system 160 comprises an SDS data server that is configured to abstract storage access services from the underlying storage hardware to thereby control and manage I/O requests issued by the compute nodes 110, as well as support networking and connectivity. The storage control system 160 comprises a software layer that is hosted by the storage node 140 and deployed in the data path between the compute nodes 110 and the storage devices 150 of the storage node 140, and is configured to respond to data I/O requests from the compute nodes 110 by accessing the storage device 150 to store/retrieve data to/from the storage devices 150 based on the I/O requests.

In an SDS environment, the storage control system 160 is configured to provision, orchestrate and manage the storage devices 150 of the storage node 140. For example, the storage control system 160 implements methods that are configured to create and manage storage pools (e.g., virtual pools of block storage) by aggregating capacity from the storage devices 150. The storage control system 160 can divide a storage pool into one or more volumes (e.g., storage volumes 152), wherein the volumes are exposed to the compute nodes 110 as block devices. The storage control system 160 exposes abstractions of block devices (e.g., virtual block devices). For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the SDS environment, each storage node 140 in FIG. 1 runs an instance of the storage control system 160 which converts the respective local storage resources (e.g., DAS storage devices 150 and/or NAS storage devices) of the storage node 140 into local block storage. Each instance of the storage control system 160 contributes some or all of its local block storage (HDDs, SSDs, PCIe, NVMe and flash cards) to the aggregated pool of storage of the storage server node cluster (e.g., data storage system 130) to implement a server-based storage area network (SAN) (e.g., virtual SAN), wherein each storage server node 140 is part of a loosely coupled server cluster which enables "scale-out" of the software-defined storage environment. In this regard, each instance of the storage control system 160 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 160 operating as SDS data servers, the software-defined storage environment comprises other components such as SDS data clients and SDS metadata managers, which are not specifically shown in FIG. 1. More specifically, on the client-side (e.g., compute nodes 110), an SDS data client (SDC) is a lightweight block device driver that is deployed to expose shared block volumes to the compute nodes 110. The SDCs run on the same servers as the compute nodes 110 which require access to the block devices exposed and managed by the storage control systems 160 of the storage nodes 140. The SDC exposes block devices representing the virtual storage volumes that are currently mapped to that host. In particular, the SDC serves as a block driver for a client (server), wherein the SDC intercepts I/O requests, and utilizes the intercepted I/O request to access the block storage that is managed by the storage control systems 160. The SDC provides the operating system or hypervisor (which runs the SDC) access to the logical block devices (e.g., volumes). The SDCs have knowledge of which SDS control systems (e.g., storage control system 160) hold its block data, so multipathing can be accomplished natively through the SDCs.

The SDS metadata managers manage SDS data client to SDS data server mapping. The SDS metadata managers manage the metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, the storage control system 160 implements any suitable logical volume management (LVM) system which is configured to create and manage the storage volumes 152 by aggregating the storage devices 150 into one or more virtual storage pools and logically dividing each storage pool into one or more storage volumes 152 that are exposed as block devices to the compute nodes 110. The creation of storage pools enables the generation of different storage tiers. A storage pool comprises a set of physical storage devices, wherein each storage device belongs to only one storage pool. In some embodiments, the storage pools are primarily utilized to group drives based on drive types and drive speeds, e.g. SSD and HDD. In some instances, a storage pool is generated to include a pool of storage devices that are aggregated using local storage devices of two or more of the storage nodes 140.

In this regard, the storage control system 160 implements volume management methods that are configured to support operations such as volume creation, volume deletion, volume mapping, etc. The storage volumes 152 illustratively comprise respective logical units (LUNs) or other types of logical storage volumes. The instances of the storage control system 160 of the storage nodes 140 include additional modules and other components typically found in conventional implementations of storage controllers and storage systems, although such additional modules and other components are omitted from the figure for clarity and simplicity of illustration.

In some embodiments, each storage control system 160 implements an instance of the snapshot management system 170. The snapshot management system 170 implements methods that are configured to generate snapshots of the storage volumes 152 and maintain snapshot data structures 154 for the snapshots, which are stored in association with the storage volumes 152 in the storage devices 150. Each snapshot data structure 154 is associated with one of the storage volumes 152. The snapshot data structures 154 comprise, for example, snapshot volume trees or other relational structures which identify relationships between the snapshots associated with the storage volumes 152. A snapshot data structure 154 includes snapshots, e.g., LUNs, that are created by capturing the state of data in one or more LUNs at a particular point in time. In some embodiments, a snapshot data structure 154 associated with a LUN that has not yet received a point-in-time snapshot may comprise only that LUN as a root node. In some embodiments, a snapshot may be both readable and writeable. In some embodiments, a snapshot may only be readable. In some embodiments, the snapshot may be configured at the time of the snapshot or at a later time to be either readable only or readable and writable.

The snapshot management system 170 implements various methods that are configured to execute functions such as snapshot creation, snapshot mapping, snapshot merging, snapshot reversion, and other similar operations related to the addition, modification, or deletion of snapshots of storage volumes. For example, the snapshot generation module 172 implements methods that are configured to generate snapshots for one or more of the persistent storage volumes 152. A snapshot comprises a read-only point-in-time copy of a storage volume. For example, an initial snapshot can be taken of a root storage volume at a given point-in-time, and then one or more additional snapshots can be taken at subsequent points in time to capture changes to the storage volume, i.e., each subsequent snapshot captures the changes that were made to the storage volume since the previous snapshot. A storage volume can be restored to a previous point in time by reverting to given snapshot, and volumes can be created from snapshots. In particular, a snapshot can be used to provision a new volume (e.g., a new volume pre-populated with the snapshot data) or to restore an existing volume to a previous state (represented by the snapshot).

The snapshot generation module 172 allows for rapid point-in-time copies to be made of a storage volume. More specifically, in some embodiments, the snapshot generation process is configured so that creating a snapshot does not involve making a duplicate copy of the source data. Instead, when an initial snapshot is created of a source storage volume, rather than generate a duplicate copy of the current state of the storage volume, the snapshot creation process simply copies the references to the source data and makes the source data as read-only. In this regard, the snapshot serves as a read-only copy of the source data at the point in time in which it was created and is accessible like a regular storage volume. Once the initial snapshot is taken of a storage volume with a dataset, subsequent snapshots copy the changed data only, and use a system of pointers and metadata to reference the initial snapshot. This method of pointer-based snapshots consumes less disk capacity than if the data set was repeatedly cloned. After a snapshot is taken, the snapshot system preserves the volume data set at that point in time by preserving any blocks that change after that point.

In this regard, unlike standard volumes, snapshots are thin-provisioned, which means that a full copy of the data is not copied over upon creation of the snapshot, and that the storage pool associated with the snapshot only stores the changes. In this regard, the snapshots are maintained in the same storage pool as the source volume. Once an initial snapshot is taken of a storage volume, subsequent snapshots copy the changed data only (i.e., subsequent snapshots are delta snapshots that only contain changes since the last snapshot), which means that only the blocks on the device that have changed after the most recent snapshot are saved, and a system of pointers and metadata is utilized to reference the snapshots. This method of pointer-based snapshots consumes less disk capacity than if the data set was repeatedly cloned. This minimizes the time required to create the snapshot and saves on storage costs by not duplicating data.

After a snapshot is taken at a given point-in-time, the snapshot system preserves the data of the storage volume which exists at such point-in-time by preserving any data blocks that change after such point-in-time, thereby allowing the compute nodes 110 to continue writing data to a production volume. Once a snapshot is taken, the source storage volume can change over time, e.g., new data is written to the storage volume, existing data is updated, or data is deleted. In particular, when new data is to be stored, the system will allocate new blocks in the storage volume to store the new data, while the data blocks associated with the snapshot copies remain unchanged. If data blocks are deleted from the storage volume but the data blocks are locked by a snapshot, the related storage will not be actually freed up for reuse. When the last snapshot to reference the deleted blocks is removed, all data blocks that were being used for the purpose of maintaining the point-in-time copy are also released automatically, such that the space used for such blocks is freed up for reuse.

Moreover, for block level updates, the updated data can be written to a newly allocated block in the active file system, with references updated to point to the new data block instead of the corresponding old (preserved) data block. In some embodiments, snapshot creation utilizes a redirect-on-write (ROW) process, which means after a snapshot is created, any new writes to the source volume will be redirected to a different storage location, while the original storage location used by the snapshot remains unchanged. In this instance, the original storage volume is never modified, and any write requests are redirected away from the original data into a new storage area. In other embodiments, snapshot creation utilizes a "copy-on-write" (COW) process whereby when a write request is made, the original data blocks are copied into a new storage area (to preserve the snapshot data), and then the original data blocks are modified. The COW process requires two data write processes, while the ROW process requires one write process.

The snapshot generation module 172 allows users to generate snapshots of existing volumes with a limit on the number of snapshots that can be generated per volume (e.g., 31 snapshots per volume, 127 snapshots per volume, etc.). In some embodiments, the snapshots of a given storage volume can be organized using a construct referred to as a "snapshot volume tree." The term "snapshot volume tree" as used herein refers to a data structure which holds a root volume and all snapshots associated with the volume, and which maintains a relationship between all snapshots resulting from one volume. A snapshot volume tree comprises a tree data structure that spans from the source volume as the root, whose siblings are either snapshots of the volume itself or descendants of it. In some embodiments, a snapshot volume tree is limited to 32 members—one for the original volume and 31 for additional snapshots (e.g., incremental snapshots).

In some exemplary embodiments where the data storage system 130 supports volume snapshots, the snapshot system 170 is configured to impose a limitation on a maximum number of allowed snapshots that can be maintained for each storage volume 152 in the storage nodes 150 (e.g., limitation on the maximum number snapshots per storage volume). This limitation mandates the need to delete snapshots to make room for additional snapshots when the maximum limit is reached. In this regard, the snapshot deletion and metadata modification module 176 is configured to delete one or more of the snapshot data structures 154 or specific portions of a given snapshot data structure, which are stored in the storage devices 150.

When a given snapshot is deleted, some of the metadata written into the given snapshot must be preserved to maintain functionality of the surviving snapshots. The snapshot deletion and metadata modification module 176 performs a snapshot deletion process by transferring ownership of the metadata of the deleted snapshot to one of the surviving snapshots. In this regard, when a snapshot is deleted for whatever reason, care must be taken that any descendant snapshot spawned from the deleted snapshot does not become dysfunctional. If all the data that is owned by an ancestor snapshot is removed, then descendant snapshots cannot redirect to it. If a descendant snapshot is accessed to read data blocks that were not uniquely-written in it, the data cannot be retrieved. The process of transferring the ownership of data from a deleted snapshot to an existing snapshot involves modification of metadata, which is considered a negative side-effect of the deletion process as it can impact the overall system performance.

In the context of snapshot deletion, in some embodiments, the snapshot deletion and metadata modification module 176 implements "proportional deletion" techniques for deleting snapshots and transferring ownership of unique data of the deleted snapshots to other snapshots, as disclosed in U.S. patent application Ser. No. 16/343,942, filed on Apr. 22, 2019, and entitled: Snapshot-Enabled Storage System Implementing Algorithm For Efficient Reclamation Of Snapshot Storage Space, and in U.S. patent application Ser. No. 16/343,949, filed on Apr. 22, 2019, entitled: Snapshot-Enabled Storage System Implementing Algorithm For Efficient Reading Of Data From Stored Snapshots, the disclosures of which are fully incorporated herein by reference. These applications disclose "proportional deletion" techniques to support snapshot deletion, which eliminate the need to visit all metadata that services reads from the snapshot to be deleted for purposes of modifying or deleting the metadata. Instead of implementing a naïve approach that would involve exhaustively traversing all the metadata for all the snapshots, or at least for the snapshot's ancestors, the "proportional deletion" methods provide for optimal performance by allowing the visitation of only those metadata which are relevant to the snapshot to be deleted, thereby yielding a time complexity that is proportional to the amount of effort invested in writing data associated with the snapshot to be deleted (i.e., either uniquely written into it or delegated to it from ancestors).

The snapshot longevity ranking module 174 implements methods that are configured to determine and assign longevity ranking values to the snapshots 154. The longevity ranking value, L, of a given snapshot comprises a snapshot property which represents an expected life span of the given snapshot relative to the expected life span of other snapshots. As explained in further detail below, the longevity ranking values of snapshots are utilized to select a most attractive candidate snapshot to become a new owner of the data of a deleted snapshot, with the smallest number of overall metadata modifications required. When a snapshot is deleted, some of the data written into the deleted snapshot must be preserved to maintain functionality of the surviving snapshots. This is achieved by transferring ownership of that data to one of the surviving snapshots. The selection of the most attractive candidate snapshot for assuming ownership of the data is achieved using the longevity ranking values of the remaining snapshots. The longevity ranking values provide a mechanism by which the system can quickly compare the expected life spans of snapshots, and select a snapshot (which is to assume ownership of a deleted snapshot) that is most likely to outlive all other snapshots, thereby minimizing the amount of metadata changes that need to be performed over time with deletions of snapshots for a storage volume.

Figure 2:
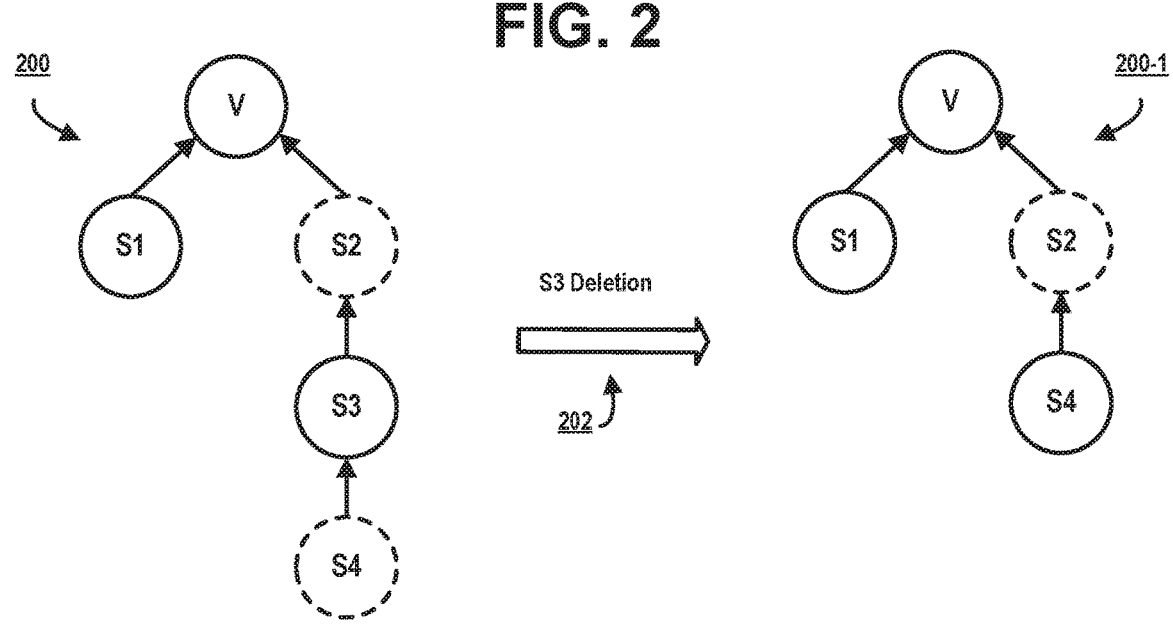
FIG. 2 schematically illustrates a snapshot deletion process for deleting a snapshot from a snapshot volume tree.

FIG. 2 schematically illustrates a process for deleting a snapshot from a snapshot volume tree data structure. In particular, FIG. 2 shows an example of a snapshot volume tree 200 at a given point of time, and modified snapshot volume tree 200-1 which is generated after deleting a snapshot from the snapshot volume tree 200. The snapshot volume tree 200 represents a given storage volume and associated snapshots that are generated over time. The snapshot volume tree 200 comprises a tree data structure having a root volume V, and a plurality of snapshots S1, S2, S3, and S4 (more generally, $S_i$) that are taken over time. In some embodiments, the root volume V represents an initial snapshot that is taken of a given storage volume, snapshots S1 and S2 represent snapshots that are taken of the root volume V at different times, snapshot S3 represents a snapshot of snapshot S2, and snapshot S4 represents a snapshot of snapshot S3. In the following description, each of V and $S_i$ is referred to as a "volume" or "volume snapshot" and its corresponding node is referred to as a "volume node" of the snapshot volume tree 200. Terms such as "volume" and "snapshot" as used herein are both intended to be broadly construed, and in some cases both terms are used to refer to a given node in a snapshot volume tree.

A volume v in the snapshot volume tree 200 is said to be the "host" to some data item $d_o$ at some volume offset o if the data item was written into v. A data item $d_o$ is uniquely described by information comprising its host, its owner, its write time, and the actual data (e.g., a reference to its address on disk). The volumes in the snapshot volume tree 200 have certain relationships as follows. For example, the direct descendants of a given volume v in a snapshot volume tree are referred to as v's "children." For example, in the exemplary snapshot volume tree 200 of FIG. 2, snapshots S1 and S2 are children of the root snapshot volume V, snapshot S3 is a child of snapshot S2, snapshot S4 is a child of snapshot S3, and snapshot S4 has no child.

Furthermore, the "ancestors" of a given volume v in a snapshot volume tree 200 include all of the volumes $v_i$ that are encountered on a path between v and the root volume (including v itself). Such a path is always guaranteed to exist in the snapshot volume tree 200, since the volume snapshot tree 200 represents a relationship of inheritance between the root volume V and all its direct and indirect descendants. For example, in the snapshot tree 200 of FIG. 2, the ancestors of snapshot S4 include V, S2, S3, and S4.

In the exemplary snapshot tree 200 of FIG. 2, the solid-outlined circles represent snapshots (e.g., S1 and S3) which comprise uniquely-written data post creation, while the dashed-outlined circles represent snapshots (e.g., S2 and S4) that do not carry uniquely-written data, and rely on ancestor snapshots to access data. More specifically, in this example, snapshot S1 comprises a delta snapshot that contains changes in the root volume at a given point-in-time, while the snapshot S2 represents a copy of the root volume V, which is made at a given-point-in time beginning a new branch in the snapshot volume tree 200. The snapshot S3 comprises a delta snapshot which contains changes made to the root storage volume at a given point-in-time since the previous snapshot S2. The snapshot S4 represents a copy of the snapshot S3 at a given point-in-time following the creation of snapshot S3.

FIG. 2 illustrates a process in which the snapshot S3 is to be deleted from the snapshot volume tree 200. If the snapshot S3 is deleted and all the data that is owned by the snapshot S3 is purged, the snapshot S4 will become dysfunctional since the snapshot S4 references data of the snapshot S3. To address this issue, the ownership of the data of the ancestor snapshot S3 is changed to a different snapshot in the snapshot volume tree 200 which will survive the deletion process. The change in data ownership generally involves modifying the metadata of the adopting snapshot (i.e., the snapshot that obtains ownership of the data of the deleted snapshot). In this regard, FIG. 2 illustrates a resulting snapshot volume tree 200-1 which is generated as a result of performing a snapshot deletion process 202 to delete the snapshot S3 and transfer ownership of the data of the snapshot S3 to the snapshot S4. As shown in FIG. 2, after the snapshot S4 has assumed ownership of the data of snapshot S3, the snapshot S4 is represented as a solid-outlined circle since the snapshot S4 now carries the uniquely-written data of the deleted snapshot S3, thus preserving the correctness of the data associated with the previous snapshot volume tree 200.

The process of modifying the metadata of a given snapshot to assume the ownership of the data of a deleted snapshot can adversely impact system performance in several ways. For example, the metadata modification process utilizes resources such as disk throughput and memory to perform the metadata modification process. In addition, the execution of metadata modification processes overtime can have a negative impact on the endurance of the disk (e.g., write amplification), especially SSDs. A primary goal of any storage system is therefore to minimize the required metadata modifications.

In some embodiments, to minimize the amount of metadata modification processes that are implemented over time with regard to snapshot deletions, the ownership of the data of a deleted snapshot is transferred to another snapshot in the snapshot volume tree which is most likely to outlive all other suitable candidate snapshots, thereby preventing the need to modify its metadata even as additional deletions take place. It should be noted that the ownership transfer takes place per each uniquely-written data item individually. By establishing which snapshot has the most likelihood to outlive others from the set of suitable candidate snapshots, one could reduce the amount of effort needed to maintain metadata of a given snapshot solution.

In some embodiments, as noted above, the snapshot longevity ranking module 174 implements methods that are configured to assign each volume snapshot with a numeric value of a snapshot property which denotes its expected longevity. In particular, the longevity ranking value, L, of a given snapshot comprises a snapshot property which represents an expected life span of the given snapshot relative to the expected life span of other snapshots. Various methods can be implemented to determine longevity ranking values L for snapshots. For example, in some embodiments, the longevity ranking values L can be determined based on an explicit hint given by the user (e.g., explicitly defined by a user). A snapshot's longevity ranking value L serves as a hint as to the likelihood of the snapshot to survive deletions, compared to other snapshots of the same snapshot volume tree. The higher the numeric value of the longevity ranking L of a snapshot, the greater the chances are of survival of the snapshot.

Figure 3:
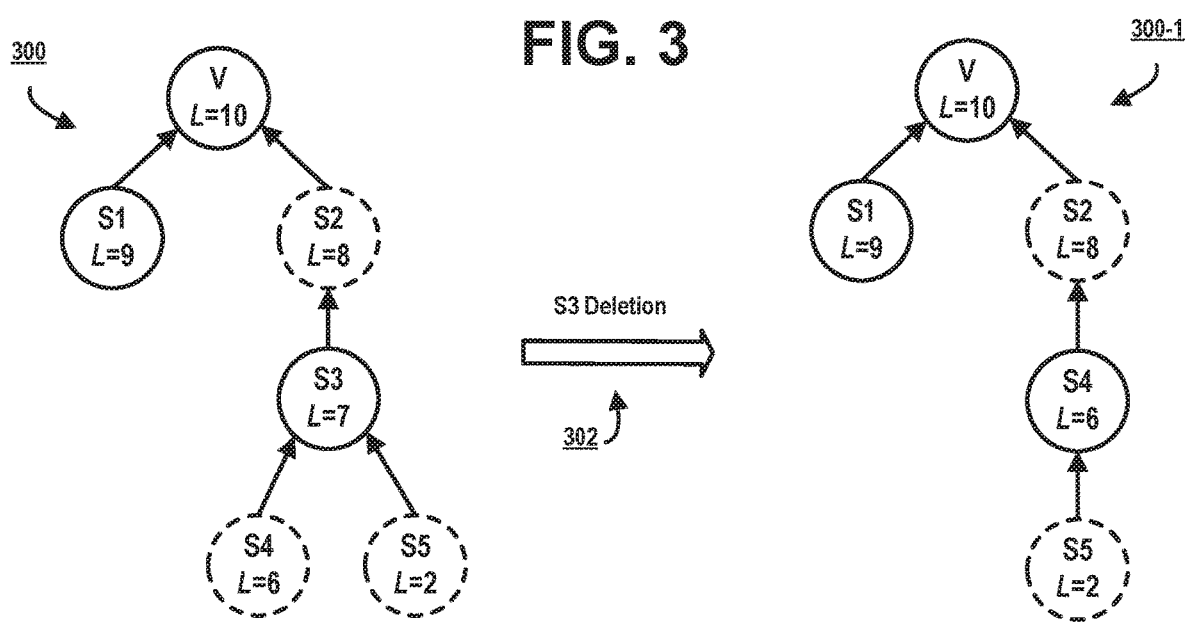
FIG. 3 schematically illustrates a snapshot deletion process which utilizes longevity ranking values of snapshots in a snapshot volume tree to determine a snapshot to assume data of a deleted snapshot, according to an exemplary embodiment of the disclosure.

FIG. 3 schematically illustrates a snapshot deletion process which utilizes longevity ranking information of snapshots in a snapshot volume tree data structure to determine a snapshot to assume data of a deleted snapshot, according to an exemplary embodiment of the disclosure. In particular, FIG. 3 shows an example of a snapshot volume tree 300 at a given point of time, and a modified snapshot volume tree 300-1 which is generated after performing a snapshot deletion process 302 to delete a snapshot from the snapshot volume tree 300. The snapshot volume tree 300 represents a given storage volume and associated snapshots that are generated over time. The snapshot volume tree 300 comprises a tree data structure having a root volume V, and a plurality of snapshots S1, S2, S3, S4, and S5 that are taken over time.

In some embodiments, the root volume V represents an initial snapshot that is taken of a given storage volume, volume snapshots S1 and S2 represent snapshots that are taken of the root volume V at different times, snapshot S3 represents a snapshot of snapshot S2, and snapshots S4 and S5 represent different snapshot copies of the snapshot S3. In the snapshot volume tree 300, the solid-outlined circles represent snapshots (e.g., S1 and S3) which comprise uniquely-written data post creation, while the dashed-outlined circles represent snapshots (e.g., S2, S4, and S5) that do not carry uniquely-written data, and rely on ancestor snapshots to access data.

As further shown in FIG. 3, each volume snapshot (V, $S_i$) in the snapshot volume tree 300 comprises a longevity ranking value, L, which provides an indication as to the likelihood of a given volume snapshot to survive deletions, as compared to other volume snapshots of the snapshot volume tree 300. For example, the source volume V has a longevity ranking, L=10, which is greater than the longevity ranking value L of all other volume snapshots in the snapshot volume tree 300, while the volume snapshot S5 has a lowest longevity ranking, L=2 among all the other volume snapshots (V, S1, S2, S3, and S4) in the snapshot volume tree 300. In this instance, the longevity ranking values indicate that the source volume V has the greatest expected longevity of all volumes in the snapshot volume tree 300, while the snapshot S5 has the lowest expected longevity of all volumes in the snapshot volume tree 300.

FIG. 3 illustrates a process in which the snapshot S3 is to be deleted from the snapshot volume tree 300. If the snapshot S3 is deleted and all the data that is owned by the snapshot S3 is purged, the snapshots S4 and S5 would become dysfunctional since both of the snapshots S4 and S5 reference the unique data of the snapshot S3. To address this issue, the ownership of the data of the ancestor snapshot S3 is changed to a different snapshot in the snapshot volume tree 300 which will survive the deletion process. The snapshot in the snapshot volume tree 300 which will assume ownership of data of the snapshot S3 is determined based, in part, on the longevity ranking values L of a set of candidate volume snapshots in the snapshot volume tree 300 (referred to as "reader volume nodes") which read the unique data of the snapshot S3 that is to be deleted.

In particular, in the exemplary embodiment of FIG. 3, when the snapshot S3 is deleted, the set of candidate snapshots that are eligible to assume ownership of the data of the deleted snapshot S3 includes the descendant snapshots S4 and S5. While either snapshot S4 or S5 can assume ownership of the data of snapshot S3, the selection is based on the longevity ranking values L of snapshots S4 and S5. Since the snapshot S4 has a longevity ranking value, L=6, which is greater than the longevity ranking value, L=2, of the snapshot S5, the snapshot S4 is selected to assume ownership of the data of the deleted snapshot S3. Indeed, in this instance, it is deemed more optimal to transfer ownership of the data of the deleted snapshot S3 to the snapshot S4 given that the snapshot S4 is expected to survive longer than the snapshot S5, based on the longevity ranking values L of the snapshots S4 and S5.

Figure 4:
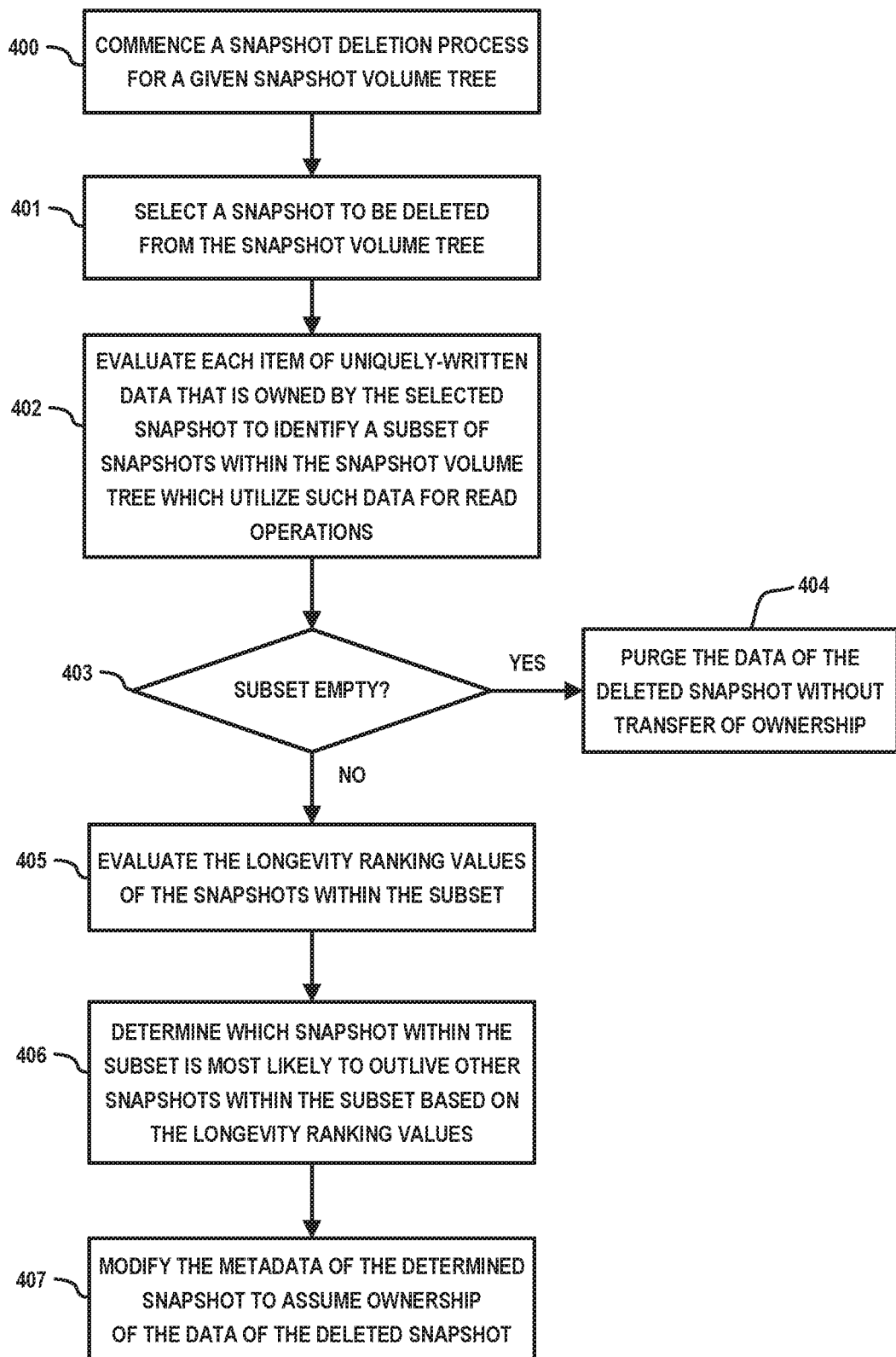
FIG. 4 is a flow diagram of a snapshot deletion process which utilizes longevity ranking values of snapshots in a snapshot volume tree to determine a snapshot to assume data of a deleted snapshot, according to an exemplary embodiment of the disclosure.

FIG. 4 is a flow diagram of a snapshot deletion process which utilizes longevity ranking information of snapshots in a snapshot volume tree data structure to determine a snapshot to assume data of a deleted snapshot, according to an exemplary embodiment of the disclosure. In some embodiments, the process of FIG. 4 illustrates an exemplary mode of operation of the snapshot deletion and metadata modification module 176 of FIG. 1B. As an initial step, a snapshot deletion process is commenced (block 400). In some embodiments, the snapshot deletion process is commenced by a user, administrator, etc., who issues a remove snapshot command that is processed by the snapshot management system 170. In some embodiments, a remove snapshot command can be issued to one of (i) remove an entire snapshot volume tree (e.g., remove entire snapshot volume tree 300), (ii) remove a segment of the snapshot volume tree rooted at a specified volume including the root (e.g., remove snapshot S2 and descendants S3, S4, and S5), (iii) remove a segment of the snapshot volume tree rooted at a specified volume, but without the root (e.g., delete descendant snapshots S3, S4, and S5 rooted at snapshot S2, while keeping snapshot S2), or (iv) remove a single volume snapshot in a branch or segment of the snapshot volume tree (e.g., remove snapshot S3, and not children snapshots S4 and S5). In some embodiments, the snapshot deletion process is performed automatically to remove one or more snapshots to comply with a snapshot creation and retention policy that is utilized for automated snapshot lifecycle management.

For purposes of discussion, we assume that a single snapshot within a given snapshot volume tree has been selected to be deleted from the snapshot volume tree (block 401). For example, in the exemplary process of FIG. 3, assume that the snapshot S3 has been selected for deletion. When the snapshot is selected for deletion, each item of uniquely-written data that is owned by the selected snapshot is evaluated to identify a subset of snapshots within the snapshot volume tree which utilize such data for read operations (block 402). The member snapshots of this subset include a set of reader volume nodes (e.g., ancestor volume nodes) in the snapshot volume tree which are deemed readers of the uniquely-written data of the snapshot to be deleted. For example, continuing with the exemplary process of FIG. 3, the snapshots S4 and S5 are deemed reader volume nodes of the uniquely-written data of the snapshot S3.

If it is determined that there are no snapshots in the snapshot volume tree that are deemed readers of the deleted snapshot (affirmative determination in block 403), the data of the deleted snapshot can be purged, and the associated memory reclaimed, without transferring the ownership of the data of the deleted snapshot to another snapshot in the snapshot volume tree (block 404). In this instance, the data is deemed to be unreferenced so that the snapshot and its associated data can be safely deleted while preserving the correctness of the data associated with the modified snapshot volume tree.

On the other hand, if it is determined that there are one or more snapshots in the snapshot volume tree which are deemed readers of the data of the deleted snapshot (negative determination in block 403), the process flow continues by evaluating the longevity ranking values of the snapshots within the subset (block 405). In some embodiments, the evaluation process is performed to determine which snapshot within the subset is most likely to outlive other snapshots within the subset based on the longevity ranking values of the snapshots (block 406). For example, in some embodiments, the evaluation process is performed to determine which snapshot within the subset has the greatest longevity ranking value. After determining which snapshot will become the new owner of the data, the metadata of the determined snapshot is modified so that the snapshot assumes the ownership of the data of the deleted snapshot (block 407).

In some embodiments, the evaluation process in block 403 and the metadata modification process of block 407 are performed using techniques as disclosed in the above-incorporated patent applications, U.S. Ser. Nos. 16/343,942 and 16/343,949. Such techniques are based, in part, on the notion of data ownership. A given volume v in a given volume snapshot tree V is said to be the "owner" of some data item $d_o$ at some volume offset o if the data item was either written into v, or was delegated to it at some later point in time. Note that when a data item is first written into some volume, that volume is both its host and its owner; however, it is not a requirement that this status endures. Note also that at any given time, any data item can have exactly one owner.

The data descriptors are more particularly defined in the following manner to include an owner. A data item $d_o$ is uniquely described by the set consisting of its host, its owner, its write time, and the actual data (or a reference to its address on disk). Formally, $d_o$=(Host($d_o$), Owner($d_o$), Time($d_o$), Address($d_o$)). Given some data item $d_o$ whose address is Address($d_o$), the set of snapshot volumes that are readers of this address is defined as a collection of all snapshot volumes that are redirected to $d_o$ when offset o is read from them. In this regard, each of the data items associated with the snapshot volume nodes has a corresponding data descriptor that identifies its corresponding host volume node, its owner volume node, its time value and its read address, wherein its host volume node denotes an initial snapshot to which the data item was written and its owner volume node denotes a potentially different snapshot determined by a possible subsequent delegation of the data item.

In some embodiments, the data descriptors for a given volume node are arranged in a block data structure using techniques as disclosed in the above-incorporated patent applications, U.S. Ser. Nos. 16/343,942 and 16/343,949. The block data structure comprises a plurality of block ownership bitmaps for respective ones of a plurality of blocks associated with respective distinct volume offset ranges. Each of the block ownership bitmaps indicates for each of the volume nodes whether or not that volume node is an owner volume node for any of the data descriptors in the corresponding block.

In block 402, the reader volume nodes in a volume tree which are readers of a corresponding data item in the snapshot to be deleted are determined based at least in part on the set of data descriptors of the deleted snapshot, wherein a reader volume nodes is identified as a volume node for which a read request made to a read address of the data item is redirected to the data item. In block 407, the process of modifying the metadata of the snapshot that assumes ownership of the data of the deleted snapshot comprises changing the ownership volume node of the data descriptors to the reader volume node that is selected to assume ownership of the data of the deleted snapshot, wherein the new owner volume node is selected from the set of reader volume nodes based on the longevity ranking values.

To obtain a proportional deletion effort of a given snapshot volume v, the total set of data descriptors (referred to as "deletion set") that need to be visited consists of all data items whose owner is v, across all offsets of the storage volume. This yields optimal time-complexity both when rewrites occur, and upon volume deletion. More particularly, upon rewrites, none of the reader volumes are accessed for modification; only the assignment of ownership for $d_o$ is potentially modified at O(1) effort. Further, upon deletion, only data descriptors that are members of the "deletion set" are accessed, instead of scanning all data descriptors belonging to the ancestors of the snapshot volume to be deleted. The realization of proportional deletion can be achieved by traversing all block ownership bitmaps for some volume, but instead of visiting all blocks associated with the volume, it is sufficient to discover which blocks actually participate in the "deletion set," and visit only those. It is expected that a typical block can host a significant number of data descriptors, thus the proportional deletion process provides a significant improvement, when the resource of importance are disk accesses. In certain implementations it could be possible to keep all of the block ownership bitmaps resident in memory, further decreasing total effort associated with deletion.

The snapshot longevity ranking module 174 can be configured to implement one or more of various techniques according to exemplary embodiments of the disclosure for determining and assigning longevity ranking values for snapshots of a given snapshot volume tree. For example, in some embodiments, as noted above, the longevity ranking values L can be determined based on explicit lifetime expectancy information for the snapshots as provided by a user when the user manually creates snapshots. In particular, when a user manually creates one or more snapshots for a given storage volume using an API (application programming interface) of the snapshot management system 170, the user can provide additional information (e.g., lifespan information) that specifies how long the given snapshot should last (e.g., minutes, hours, days, weeks, months, etc.) before the snapshot is deleted either manually or automatically by the system to comply with the maximum number of nodes of a snapshot volume tree.

As more snapshots are manually added to a given snapshot volume tree generated by the user, the user will explicitly provide lifespan information for each newly added snapshot. In some instances, the user can change the specified lifespan of one or more previously generated snapshots. The snapshot longevity ranking module 174 will process the explicit lifespan information of the snapshots within the snapshot volume tree and assign longevity ranking values L to the snapshots based on the explicit lifespan information. In this embodiment, the longevity ranking values L are assigned to the snapshots in a way that the current set of longevity ranking values provide an indication of the longevity of the snapshots relative to a same time reference.

For example, assume a first snapshot is generated with a specified lifespan of 1 day (24 hours), and a second snapshot is generated (as a child of the first snapshot) with a specified lifespan of 6 hours. If the second snapshot is generated at a point-in-time which is less than 6 hours from the expiration of the lifespan of the first snapshot, the second snapshot would be assigned a longevity ranking value which is greater than the longevity ranking value of the first snapshot. This is because at the time the second snapshot is generated relative to the time the first snapshot was generated, the second snapshot would have a life expectancy (e.g., 6 hours) that exceeds the current life expectancy (less than 6 hours) of the first snapshot, irrespective of the fact that the first snapshot was initially generated with a specified lifespan of 24 hours.

In this regard, the longevity ranking values L of the snapshots within a given snapshot volume tree provide an indication of the relative life expectancies of the snapshots within the snapshot volume tree, wherein the higher the numeric value of the longevity ranking L of a given snapshot, the greater the chances are of survival of the snapshot relative to other snapshots in the given snapshot volume tree which have lower longevity ranking values. It is to be noted that the difference between the longevity ranking values of two snapshots does not provide an indication of the proportion or difference in the expected lifespans of the two snapshots—only which one of the two snapshots has longer expected lifespan relative to the other snapshot.

Figure 5:
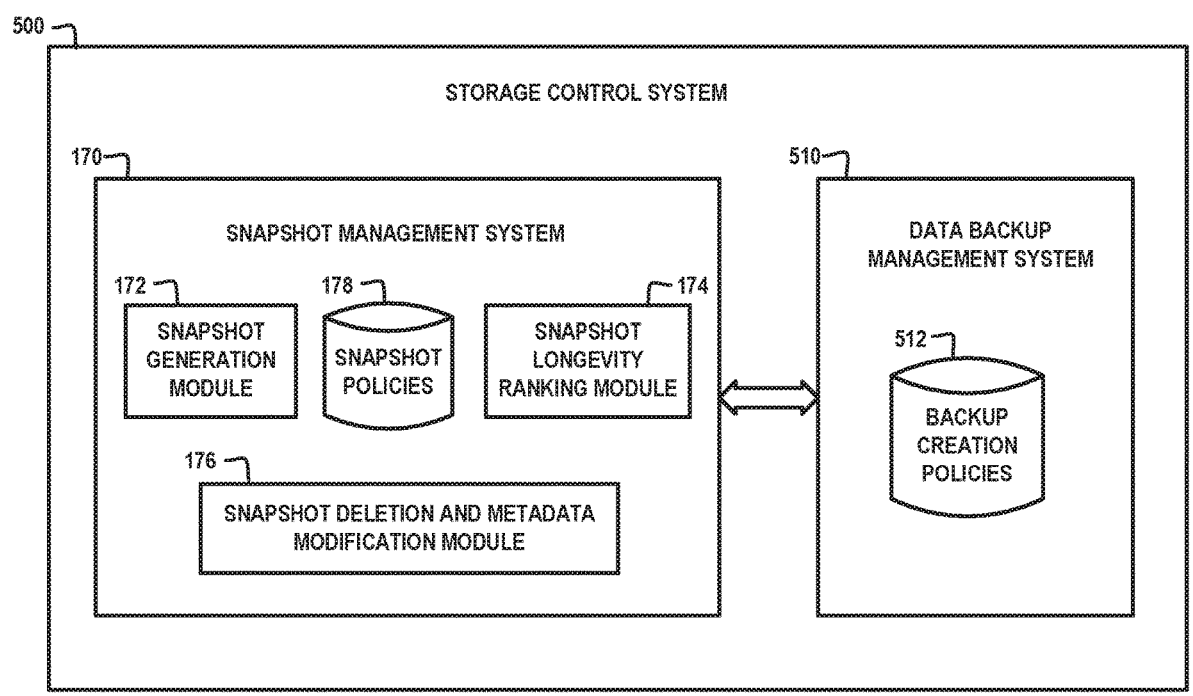
FIG. 5 schematically illustrates a storage control system which is configured to automatically determine and assign longevity ranking values to snapshots of a given storage volume based on predefined snapshot policies and snapshot policies derived from data backup policies, according to an exemplary embodiment of the disclosure.

In other embodiments, the snapshot longevity ranking module 174 implements heuristic processing methods that are configured to automatically determine and assign longevity ranking values L to snapshots of a given storage volume based on predefined policies associated with data backup and data recovery solutions that are implemented by the storage control system. For example, FIG. 5 schematically illustrates a storage control system which is configured to automatically determine and assign longevity ranking values to snapshots of a given storage volume based on predefined snapshot policies and snapshot policies derived from data backup policies, according to an exemplary embodiment of the disclosure. The storage control system 500 of FIG. 5 comprises an alternative embodiment that can be implemented in the storage nodes 140 of FIGS. 1A and 1B. As shown in FIG. 5, the storage control system 500 is similar to the storage control system 160 shown in FIG. 1B, except that the storage control system 500 of FIG. 5 further comprises a data backup management system 510 that is configured to provide data backup and recovery services according to one or more specified backup creation policies 512. In addition, FIG. 5 illustrates an exemplary embodiment in which the snapshot management system 170 is configured to automatically generate snapshots of storage volumes based on one or more snapshot policies 178.

More specifically, in some embodiments, the snapshot management system 170 is configured to automate snapshot management by implementing methods to automate the creation, retention, and deletion of snapshots that are taken for storage volume. A snapshot policy includes a default or custom schedule for automatically creating snapshots of a given storage volume and specifying retention policies. For example, a given snapshot policy can specify a start time and interval for creating snapshots, how many copies to retain, how to name the snapshots, etc. and other types of information that can automatically manage the lifecycle of snapshots. Similarly, a backup creation policy comprises a predefined schedule for copying the data of a storage volume to a target storage to ensure data recoverability in the event of accidental data deletion, corrupted information, system outage, etc. As explained in further detail below, the snapshot longevity ranking module 174 leverages the snapshot policies 178 and/or the backup creation policies 512 to automatically determine and assign longevity ranking values to snapshots of a given snapshot volume tree.

The data backup management system 510 can implement one or more different types of data backup techniques such as, e.g., full backup, incremental backup, differential backup, mirrored backup, etc. In some embodiments, the backup copies of storage volumes are stored in a different location than the original data to ensure disaster recovery in the event of failure of the storage node or storage resources that store the original data. The data backup management system 510 provides the ability to create multiple backups of a given storage volume to enable the storage system to restore to a given one of multiple previous points in time other than a most recent backup. Backups are designed to be stored for long periods of time, and when stored off server, can be used to restore servers after server failure. Unlike snapshots, a data backup process can take a relatively long time (e.g., hours, days, etc.) to complete, depending on the amount of data, which means that the data at the end of the backup may not be consistent with the data at the time when the backup started.

In some embodiments, data backup of a given volume is performed by leveraging snapshots of the given volume by copying a snapshot to another storage system to create a backup. For example, a snapshot can be taken of a storage volume to provide an instantaneous point-in-time copy of the data of the storage volume at the time of the snapshot. This ensures the data is consistent with an exact time of day. The snapshot can then be backed up to a remote storage, which takes time. But since the data of the snapshot is already frozen in time, there is no risk of the data changing during the copy. In addition, one or more additional backups of the storage volume at subsequent times can be generated by backing up one or more delta snapshots of the storage volume. In this regard, while the data backup system can leverage snapshots to copy data, disaster recovery does not need to rely on volume snapshots remaining in place, as snapshots are typically deleted in a relatively short time as compared to the time that backups are retained. The snapshot allows the data backup management system to grab data from the storage volume to create backups, whereby the temporary snapshots can be deleted once a backup cycle is completed. While snapshots can be used to recreate a storage volume, the data backups provide an autonomous copy of the data which allows the recreation of a previous storage volume at some previous point in time without any reliance on the source volume.

As discussed above, to comply with limits on the maximum number of allowed/available snapshots per storage volume, one or more snapshots of a snapshot volume tree must be deleted to make room for new snapshots, as the maximum limit approaches. As snapshot deletions take place, some of the data is purged and some must be reassigned to one of the surviving snapshots to maintain correctness. The best candidate snapshot to assume ownership of the data is the one whose chances of surviving future deletions are the best, which is determined using the longevity ranking property of the remaining snapshots. For the longevity ranking information to be useful, the longevity ranking values should be assigned intelligently to each of the snapshots of a given storage volume.

In some embodiments, the snapshot longevity ranking module 174 leverages the snapshot policies 178 to automatically and intelligently determine and assign longevity ranking values to snapshots of a given snapshot volume tree. In particular, is some embodiments, this is implemented by assigning a given storage volume a "snapshots policy" property. The snapshots policy property serves to provide information with regard to an intended pattern or schedule for creating snapshots of a given volume, wherein such information is utilized to intelligently determine and assign optimal longevity ranking values for the snapshots of the given volume and, thereby, ensure a more optimal system performance.

More specifically, when a user initially creates a new storage volume, the user can also specify a default or custom "snapshot policy" to apply to the new storage volume. The snapshot policy specifies as least one snapshot creation schedule that can be utilized by the snapshot generation module 172 for automatically creating snapshots for the storage volume. The following policies are some examples of use-cases which can be the basis for intelligently determining and assigning longevity ranking values to snapshots of a given storage volume.

For example, with incremental backups, the data of a given storage volume can be backed up to a secondary storage by taking point-in-time snapshots. In particular, snapshots are incremental backups, which means that only the blocks on the device that have changed after the most recent snapshot are saved. This minimizes the time required to create the snapshot and saves on storage costs by not duplicating data. In this instance, when each new snapshot is spawned from the last created snapshot in a chain, the snapshots serve as "restore points" in cases of disaster-recovery. As an example of an incremental snapshot policy for a given volume, a user may specify to take a snapshot every 24 hours starting at 6:00 am, and further specify a retention policy that only 7 snapshots should be retained (e.g., oldest snapshot of 1 week old will be automatically deleted). When a snapshot is deleted, only the data unique to that snapshot is removed. Each snapshot contains all of the information that is needed to restore your data from the moment when the snapshot was taken to a new volume.

Figure 6:
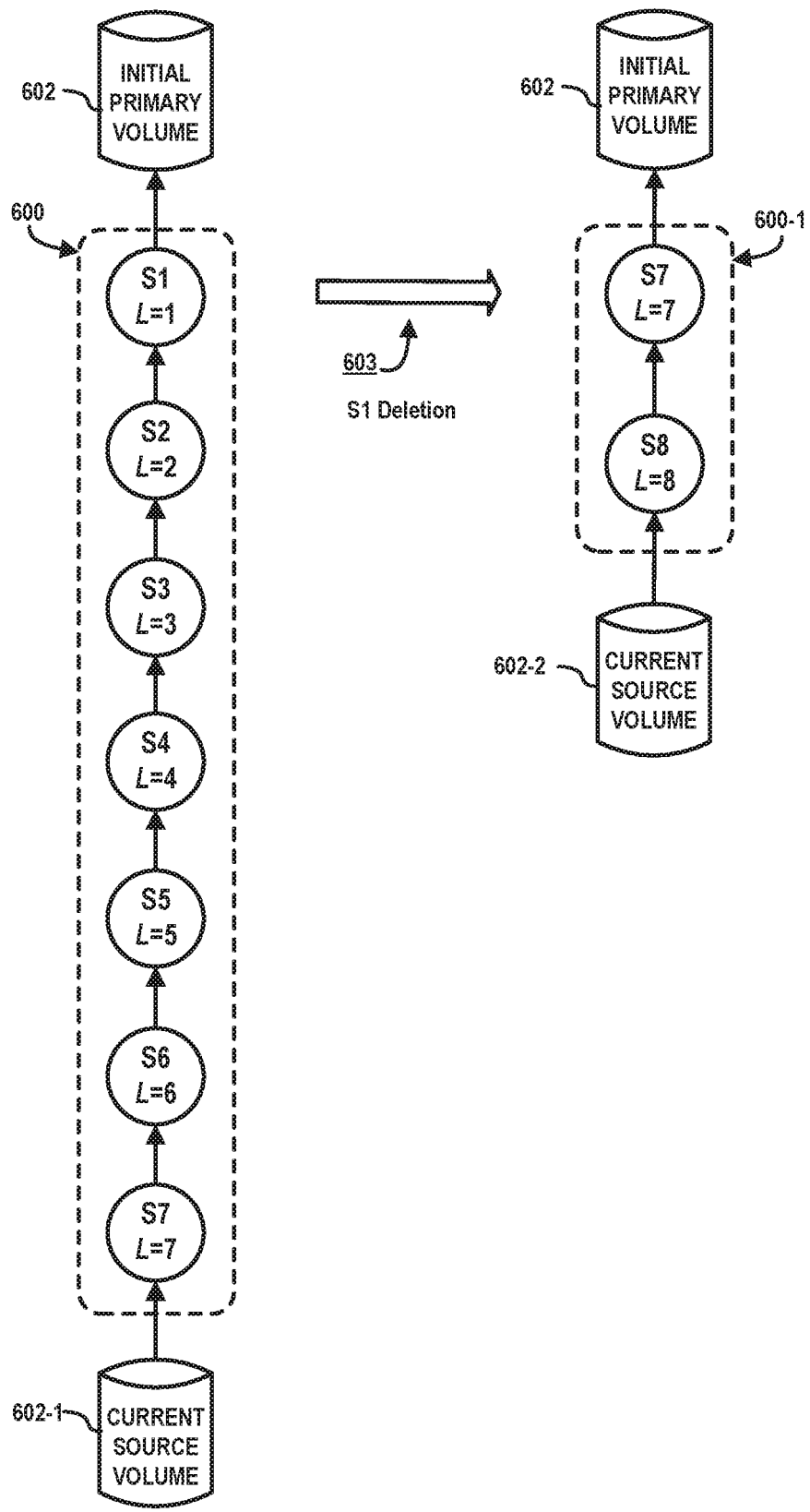
FIG. 6 schematically illustrates a process for automatically assigning longevity ranking values to incremental snapshots of a storage volume, according to an exemplary embodiment of the disclosure.

When an incremental snapshot policy is applied, the oldest snapshot is most likely the snapshot that will be deleted to make room for new snapshots. In some embodiments, for an incremental snapshot policy, the longevity ranking values of the snapshots can therefore be assigned as sequentially increasing positive integer values. By way of example, FIG. 6 schematically illustrates a process for automatically assigning longevity ranking values to incremental snapshots of a storage volume, according to an exemplary embodiment of the disclosure. In particular, FIG. 6 illustrates a snapshot volume tree 600 which comprises a sequence of incremental snapshots S1, S2, S3, S4, S5, S6, and S7. The initial snapshot S1 is a snapshot that captures all blocks of an initial volume 602. Each incremental snapshot S2, S3, S4, S5, S6, and S7 thereafter captures block changes since the previous snapshot. A current volume 602-1 represents an updated current production volume of the initial volume 602 which exists at some point-in-time following creation of the last snapshot S7.

For illustrative purposes, FIG. 6 shows the snapshots S1, S2, S3, S4, S5, S6, and S7 of the snapshot volume tree 600 being assigned respective longevity ranking values $L=1, 2, 3, 4, 5, 6,$ and $7$, which represents an increasing sequence of positive integer values with a positive step value=1. In other embodiments, positive step values other than 1 can be utilized to increase the longevity ranking values L, and the initial value can be an integer other than 1. For example, in some embodiments, the snapshots S1, S2, S3, S4, S5, S6, and S7 in the snapshot volume tree 600 can be assigned a sequence of longevity ranking values L=5, 10, 15, 20, 25, 30, 35, respectively, or a sequence of longevity ranking values L=2, 4, 6, 8, 10, 12, 14, respectively, or other sequences of increasing positive integer values. Again, as noted above, in some embodiments, the difference between the longevity ranking values of two snapshots does not provide an indication of the proportion or difference in the expected lifespans of the two snapshots—only which one of the two snapshots has longer expected lifespan relative to the other snapshot. In other implementations, longevity ranking values of the snapshots can be configured such that a difference between the longevity ranking values of two snapshots does provide an indication of the proportion or difference in the expected lifespans of the two snapshots at a given point in time.

Assume further that the primary volume 602 has an incremental snapshot policy which specifies a snapshot to be automatically generated every 24 hours starting at 6:00 am, and a retention policy which specifies that only a fixed number of snapshots can be maintained for the primary volume 602 and that after the maximum number of snapshots is reached, the oldest snapshot is deleted when taking a new snapshot. Assuming that the retention policy specifies that a maximum of 7 snapshots can maintained for the snapshot volume tree 600, the addition of another snapshot (e.g., snapshot S8) in the snapshot volume tree 600 following the snapshot S7 will result in the number of snapshots exceeding the specified limit of 7 snapshots. In this instance, the retention policy will take effect, so that the oldest snapshot will be removed from the snapshot tree 600.

In the illustrative embodiment of FIG. 6, the initial snapshot S1 is deemed to be the oldest snapshot for the primary volume 602. In this instance, the snapshot deletion and metadata modification module 176 will perform a deletion process 603 such as described above (e.g., FIG. 4) to delete the snapshot S1 and transfer ownership of the data of the deleted snapshot S1 to another snapshot in the snapshot volume tree 600 which is selected based, at least in part on, the longevity ranking values L. For example, as noted above, an initial step includes determining one or more snapshots in the snapshot volume tree 600 which are deemed readers of the data of the deleted snapshot S1. In this example, we can assume that each of the subset of snapshots S2, S3, S4, S5, S6 and S7 are reader volumes of the data of the first snapshot S1.

In addition, by evaluating the longevity ranking values of the snapshots S2-S7, the process determines that the snapshot S7 is most likely to outlive the other snapshots within the subset based on the longevity ranking value L=7 of the snapshot S7. After determining that snapshot S7 will become the new owner of the data of the deleted snapshot S1, the metadata of the snapshot S7 is modified so that the snapshot S7 assumes the ownership of the data of the deleted snapshot S1. In addition, since the snapshot S7 is a reader of unique data of snapshots S2-S6, the snapshot S7 will also assume ownership of the data of snapshots S2-S6.

As shown in FIG. 6, a new snapshot volume tree 600-1 is generated after deleting the snapshot S1 and the intervening snapshots S2-S6, with the snapshot S7 assuming the data of the deleted snapshot S1 and the intervening snapshots S2-S6. In this example, the snapshot S7 begins a new chain of snapshots from the primary volume 602, wherein the new snapshot S8 includes the block changes that occurred after the generation of the snapshot S7, wherein additional changes made to a current source volume 600-2 can be captured in a next incremental snapshot (e.g., S9) at some point-in-time following the last generated snapshot S8.

In other embodiments, even when an automated snapshot creation and deletion process is implemented according to some snapshot policy, the snapshot management system 170 can be configured to allow a user to access a given snapshot volume tree to, e.g., manually delete one or more existing snapshots. For example, in the illustrative embodiment of FIG. 6, a user can access the snapshot volume tree and manually delete a given one of the snapshots S1-S7, and the system will proceed to automatically update the metadata as needed to transfer ownership. For example, assume the user manually deletes the snapshot S4 from the snapshot volume tree 600. In this instance, the snapshot deletion and metadata modification module 176 will proceed to transfer ownership of the data of the deleted snapshot S4 to another snapshot in the snapshot volume tree 600 which is selected based, at least in part on, the longevity ranking values L. For example, in this instance, assuming that the snapshots S5, S6, and S7 are reader volumes of the data of the snapshot S4, by evaluating the longevity ranking values of the snapshots S5-S7, the process determines that the snapshot S7 is most likely to outlive the other snapshots within the subset based on the longevity ranking value L=7 of the snapshot S7. After determining that snapshot S7 will become the new owner of the data of the deleted snapshot S4, the metadata of the snapshot S7 is modified so that the snapshot S7 assumes the ownership of the data of the deleted snapshot S4. In addition, since the snapshot S7 is a reader of unique data of snapshots S5 and S6, the snapshot S7 will also assume ownership of the data of snapshots S5 and S6. This process results in a new snapshot volume tree with the snapshot S7 becoming a direct descendant or child of snapshot S3.

Figure 7:
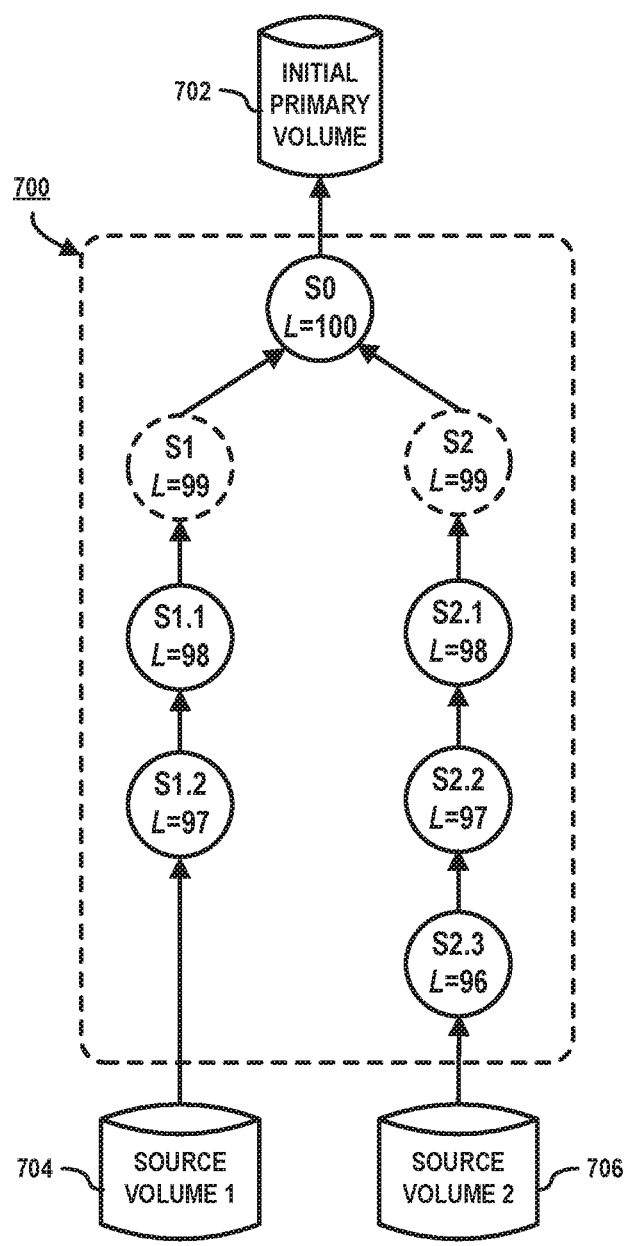
FIG. 7 schematically illustrates a process for automatically assigning longevity ranking values to snapshots that are generated from a master snapshot copy of a storage volume, according to another exemplary embodiment of the disclosure.

FIG. 7 schematically illustrates a process for automatically assigning longevity ranking values to snapshots that are generated from a master snapshot copy of a storage volume, according to another exemplary embodiment of the disclosure. In particular, FIG. 7 snapshot volume tree 700 comprising a master snapshot S0 which represents a master copy of a primary storage volume 702. The master snapshot S0 comprises a read-only copy of the primary volume 702. The snapshot volume tree 700 further comprises clone snapshots S1 and S2 which reference the master snapshot S0 and which are children nodes that start separate branches in the snapshot volume tree 700 which incrementally record changes in respective source production volumes 704 and 706. The clone snapshots S1 and S2 enable the creation and use of different clone volumes for various purposes such as, e.g., application testing.

As further shown in FIG. 7, a first branch in the snapshot volume tree 700 comprises the initial clone snapshot S1 and a chain of incremental snapshots S1.1 and S1.2. In addition, a second branch in the snapshot volume tree 700 comprises the initial clone snapshot S2 and a chain of incremental snapshots S2.1, S2.2, and S2.3. In this illustrative embodiment where snapshots are spawned from the master copy S0 and the clone snapshots S1 and S2 are utilized to capture changes made to the master copy, the oldest snapshot (e.g., master snapshot S0, and clone snapshots S1 and S2) will most likely outlive all other snapshots. As such, as shown in FIG. 7, longevity ranking values can be assigned as a sequentially decreasing positive integer number. Note that additional snapshots policies could be formulated as combinations of the above, without loss of generality to the principles described herein.

In some embodiments, the snapshot longevity ranking module 174 leverages the backup creation policies 512 of storage volumes to automatically and intelligently determine and assign longevity ranking values to snapshots associated with such storage volumes. More specifically, as noted above, the data backup management system 510 can perform full and incremental backups of a given storage volume by leveraging the snapshots that are created by the snapshot management system 170 for the given storage volume at various points-in-time by copying the volume snapshots to another storage system to store incremental and full backups of the given storage volume. The data backup management system 510 can employ backup creation policies 512 that correspond with the incremental and master copy snapshot use cases as shown in FIGS. 6 and 7. In this regard, the integration of the snapshot and data backup management systems 170 and 510 allows the snapshot management system 170 to automatically "derive" snapshot policies using knowledge of the backup creation policies 512. In such embodiments, the snapshot policies that are derived from the data backup policies of the storage volumes reflect the scheduling and retention polices for incremental and full backups of the storage volumes and the snapshots of a given volume. These derived snapshot policies are then utilized to automatically and intelligently assign longevity ranking values to the snapshots of storage volumes which are used to create the incremental and full data backups of the storage volumes.

For example, when backups are requested for a given storage volume, the data backup management system 510 can assign an "incremental backup" policy to the given volume, thus facilitating optimal longevity ranking assignment. In this instance, elaborate snapshot policies can be formulated from the backup creation policies 512 to support hierarchical backup intervals representing some retention cadence. For example, consider the following backup creation policy for a given storage volume:
  (i) create a backup every 60 minutes;
  (ii) retain the backup created daily at 8 A.M. for a duration of one week;
  (iii) retain the backup created at 8 A.M. on the last day of each week for a duration of one month; and
  (iv) retain the backup created on the last week of each month for a duration of 12 months.
This exemplary backup creation policy can be expressed as a snapshot policy for the given storage volume, wherein longevity ranking values L can be assigned to the snapshots (which are used to create the incremental and full backups) in a manner that reflects the hierarchy as described:
  (i) hourly snapshots not taken at 8 A.M. are assigned longevity ranking values L from a predefined range of values, e.g., [L=1, . . . , 23];
  (ii) daily snapshots taken at 8 A.M. not occurring on the last day of the week are assigned longevity ranking values from a predefined range of values, e.g., [L=30, . . . , 36];
  (iii) weekly snapshots taken at 8 A.M. on the last day of a week that is not the last of that month are assigned longevity ranking values L in a predefine draft of values, e.g., [L=40, . . . , 45]; and
  (iv) monthly snapshots taken at 8 A.M. on the last day of the last week of a month are assigned longevity ranking values from a predefined range of values, e.g., [L=50, . . . , 62].

One of ordinary skill in the art can readily envision how a retention policy for data backup of a given storage volume can be translated to a predefined schedule for snapshot creation and deletion per snapshot tree. Using such predefined schedule, the snapshots can be ordered in an existing snapshot volume tree, in any given point-in-time, by the expected deletion times of the snapshots.

It is to be understood that the snapshot and data backup management systems 170 and 510 may implement any suitable timer mechanism to determine a "point-in-time" to execute respective functions. For example, in some embodiments, the snapshot and data backup management systems 170 and 510 utilize a POSIX timer which is based on Epoch time (also referred to as UNIX time). As is known in the art, the Epoch time is the number of seconds that have elapsed since Jan. 1, 1970 (midnight UTC/GMT), not counting leap seconds.

The Epoch time can be utilized to determine and assign numeric longevity ranking values L to snapshots, without loss of generality, by defining: L(v)={number of seconds that pass from the Epoch time of creation to the Epoch time of deletion}, where v denotes a given volume snapshot of a given storage volume. The values L(v) for the snapshots provide comparable numeric values for volume longevity ranking.

Figure 8:
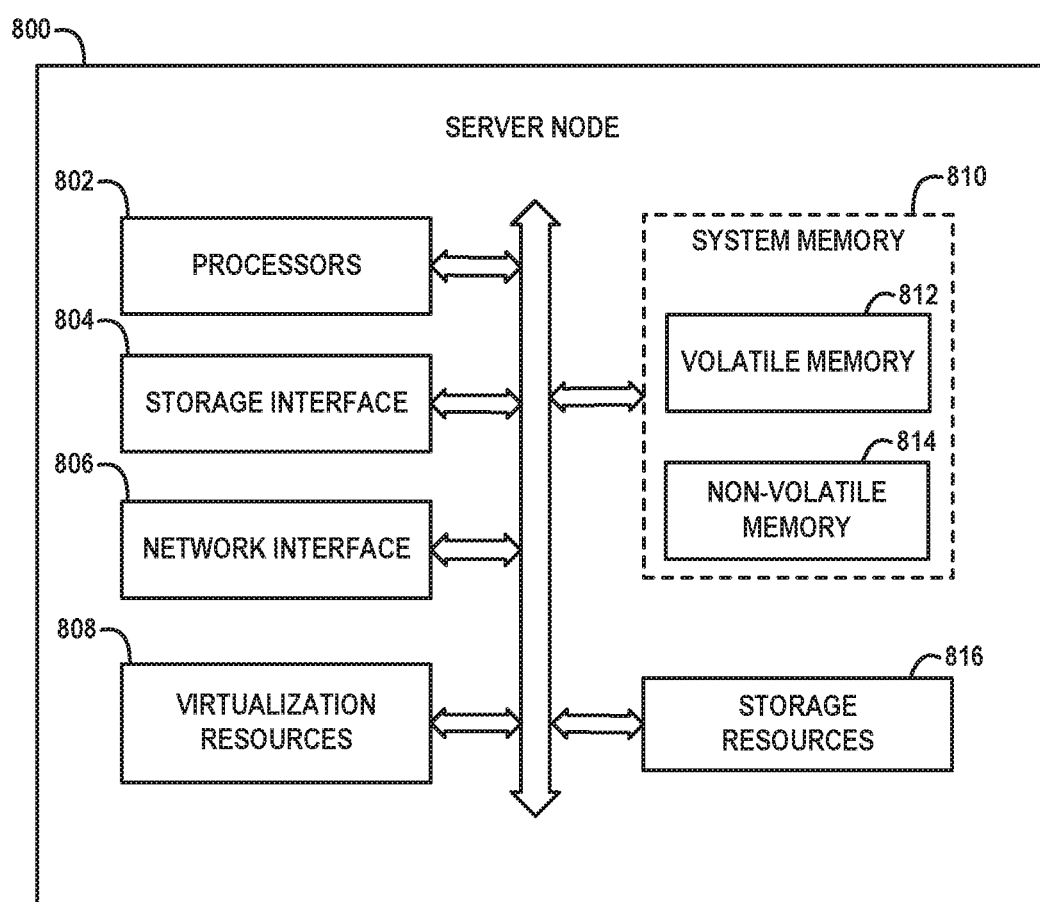
FIG. 8 schematically illustrates a framework of a server node for implementing a storage node which hosts a snapshot management system according to an exemplary embodiment of the disclosure.

FIG. 8 schematically illustrates a framework of a server node (e.g., storage node 140, FIGS. 1A and 1B) which can be implemented for hosting a storage control system such as shown in FIG. 1B or FIG. 5, according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814.

The processors 802 comprise one or more types of hardware processors that are configured to process program instructions and data to execute a native operating system (OS) and applications that run on the server node 800. For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/ storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of the storage control systems 160 and 500 as shown in FIGS. 1B and 5 as discussed herein. In one embodiment, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well execute one or more of the various modules and functionalities of the storage control systems 160 and 500 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, snapshot management systems, and data backup management systems comprise program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile system memory 812 is configured as the highest-level memory tier, and the non-volatile system memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

maintaining, by a snapshot management system, a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective longevity ranking values, wherein the longevity ranking value of a given snapshot volume node comprises a numeric value which represents a likelihood of the given snapshot volume node not being selected for deletion as compared to other snapshot volume nodes in the snapshot volume tree, as indicated by their respective longevity ranking values;

deleting, by the snapshot management system, a snapshot volume node from the snapshot volume tree in response to a snapshot delete command;

determining, by the snapshot management system, a set of candidate snapshot volume nodes within the snapshot volume tree which can assume ownership of uniquely-written data that is owned by the deleted snapshot volume node, wherein the determined set of candidate snapshot volume nodes comprises snapshot volume nodes within the snapshot volume tree which are readers of the uniquely-written data owned by the deleted snapshot volume node;

evaluating, by the snapshot management system, the longevity ranking values of the candidate snapshot volume nodes;

selecting, by the snapshot management system, a snapshot volume node from the set of candidate snapshot volume nodes to assume ownership of the uniquely-written data of the deleted snapshot volume node, based on the evaluation of the longevity ranking values; and modifying metadata of the selected snapshot volume node to transfer the ownership of the uniquely-written data from the deleted snapshot volume node to the selected snapshot volume node.

2. The method of claim 1, wherein evaluating the longevity ranking values of the candidate snapshot volumes nodes comprises determining, by the snapshot management system, which of the candidate snapshot volume nodes has a highest longevity ranking value, and wherein the candidate snapshot volume determined to have the highest longevity ranking value is selected to assume ownership of the uniquely-written data of the deleted snapshot volume node.

3. The method of claim 1, further comprising deleting the uniquely-owned data of the deleted snapshot in response to determining that there are no candidate snapshot volume nodes in the snapshot volume tree which can assume ownership of the uniquely-written data of the deleted snapshot volume node.

4. The method of claim 1, further comprising assigning, by the snapshot management system, the respective longevity ranking values to the snapshot volume nodes based on explicit longevity information provided by a user when creating the snapshot volume nodes.

5. The method of claim 1, wherein the snapshot delete command comprises one of (i) an explicit delete command provided by a user interacting with the snapshot management system and (ii) a command that is automatically generated by the snapshot management system based on a snapshot retention policy.

6. The method of claim 1, wherein each data item of the uniquely-written data comprises metadata which identifies an owner volume node of the data item, and a read address of the data item, and wherein modifying the metadata of the selected snapshot volume node to transfer the ownership of the uniquely-written data from the deleted snapshot volume node to the selected snapshot volume node comprises modifying the metadata of the data items of the uniquely-written data to identify the selected snapshot volume node as the owner volume node of the data items associated with the uniquely-written data.

7. An article of manufacture comprising a non-transitory processor-readable storage medium having stored therein program code of one or more software programs, wherein the program code is executable by one or more processors to implement a method comprising:

maintaining, by a snapshot management system, a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective longevity ranking values, wherein the longevity ranking value of a given snapshot volume node comprises a numeric value which represents a likelihood of the given snapshot volume node not being selected for deletion as compared to other snapshot volume nodes in the snapshot volume tree, as indicated by their respective longevity ranking values;

deleting, by the snapshot management system, a snapshot volume node from the snapshot volume tree in response to a snapshot delete command;

determining, by the snapshot management system, a set of candidate snapshot volume nodes within the snapshot volume tree which can assume ownership of uniquely-written data that is owned by the deleted snapshot volume node, wherein the determined set of candidate snapshot volume nodes comprises snapshot volume nodes within the snapshot volume tree which are readers of the uniquely-written data owned by the deleted snapshot volume node;

evaluating, by the snapshot management system, the longevity ranking values of the candidate snapshot volume nodes;

selecting, by the snapshot management system, a snapshot volume node from the set of candidate snapshot volume nodes to assume ownership of the uniquely-written data of the deleted snapshot volume node, based on the evaluation of the longevity ranking values; and modifying metadata of the selected snapshot volume node to transfer the ownership of the uniquely-written data from the deleted snapshot volume node to the selected snapshot volume node.

8. The article of manufacture of claim 7, wherein evaluating the longevity ranking values of the candidate snapshot volumes nodes comprises determining, by the snapshot management system, which of the candidate snapshot volume nodes has a highest longevity ranking value, and wherein the candidate snapshot volume determined to have the highest longevity ranking value is selected to assume ownership of the uniquely-written data of the deleted snapshot volume node.

9. The article of manufacture of claim 7, further comprising deleting the uniquely-owned data of the deleted snapshot in response to determining that there are no candidate snapshot volume nodes in the snapshot volume tree which can assume ownership of the uniquely-written data of the deleted snapshot volume node.

10. The article of manufacture of claim 7, further comprising assigning, by the snapshot management system, the respective longevity ranking values to the snapshot volume nodes based on explicit longevity information provided by a user when creating the snapshot volume nodes.

11. The article of manufacture of claim 7, wherein the snapshot delete command comprises one of (i) an explicit delete command provided by a user interacting with the snapshot management system and (ii) a command that is automatically generated by the snapshot management system based on a snapshot retention policy.

12. The article of manufacture of claim 7, wherein each data item of the uniquely-written data comprises metadata which identifies an owner volume node of the data item, and a read address of the data item, and wherein modifying the metadata of the selected snapshot volume node to transfer the ownership of the uniquely-written data from the deleted snapshot volume node to the selected snapshot volume node comprises modifying the metadata of the data items of the uniquely-written data to identify the selected snapshot volume node as the owner volume node of the data items associated with the uniquely-written data.

13. A server node, comprising:
at least one processor; and
system memory configured to store program code, wherein the program code is executable by the at least one processor to implement a snapshot management system which is configured to:
maintain a snapshot volume tree for a storage volume of a storage system, wherein the snapshot volume tree comprises a data structure which comprises a plurality of snapshot volume nodes corresponding to respective ones of (i) a root volume and (ii) multiple snapshots related directly or indirectly to the root volume, wherein the snapshot volume nodes comprise respective longevity ranking values, wherein the longevity ranking value of a given snapshot volume node comprises a numeric value which represents a likelihood of the given snapshot volume node not being selected for deletion as compared to other snapshot volume nodes in the snapshot volume tree, as indicated by their respective longevity ranking values;
delete a snapshot volume node from the snapshot volume tree in response to a snapshot delete command;
determine a set of candidate snapshot volume nodes within the snapshot volume tree which can assume ownership of uniquely-written data that is owned by the deleted snapshot volume node, wherein the determined set of candidate snapshot volume nodes comprises snapshot volume nodes within the snapshot volume tree which are readers of the uniquely-written data owned by the deleted snapshot volume node;
evaluate the longevity ranking values of the candidate snapshot volume nodes;
select a snapshot volume node from the set of candidate snapshot volume nodes to assume ownership of the uniquely-written data of the deleted snapshot volume node, based on the evaluation of the longevity ranking values; and
modify metadata of the selected snapshot volume node to transfer the ownership of the uniquely-written data from the deleted snapshot volume node to the selected snapshot volume node.

14. The server node of claim 13, wherein in evaluating the longevity ranking values of the candidate snapshot volumes nodes, the snapshot management system is configured to determine which of the candidate snapshot volume nodes has a highest longevity ranking value, and wherein the candidate snapshot volume determined to have the highest longevity ranking value is selected to assume ownership of the uniquely-written data of the deleted snapshot volume node.

15. The server node of claim 13, wherein the snapshot management system is configured to delete the uniquely-owned data of the deleted snapshot in response to determining that there are no candidate snapshot volume nodes in the snapshot volume tree which can assume ownership of the uniquely-written data of the deleted snapshot volume node.

16. The server node of claim 13, wherein the snapshot management system is configured to assign the respective longevity ranking values to the snapshot volume nodes based on explicit longevity information provided by a user when creating the snapshot volume nodes.

17. The server node of claim 13, wherein each data item of the uniquely-written data comprises metadata which identifies an owner volume node of the data item, and a read address of the data item, and wherein modifying the metadata of the selected snapshot volume node to transfer the ownership of the uniquely-written data from the deleted snapshot volume node to the selected snapshot volume node comprises modifying the metadata of the data items of the uniquely-written data to identify the selected snapshot volume node as the owner volume node of the data items associated with the uniquely-written data.

18. The server node of claim 13, wherein the snapshot delete command comprises one of (i) an explicit delete command provided by a user interacting with the snapshot management system and (ii) a command that is automatically generated by the snapshot management system based on a snapshot retention policy.

* * * * *